US010552456B2

(12) United States Patent
Brown

(10) Patent No.: US 10,552,456 B2
(45) Date of Patent: Feb. 4, 2020

(54) DERIVING DEPENDENCY INFORMATION FROM TRACING DATA

(71) Applicant: Red Hat, Inc., Raleigh, NC (US)

(72) Inventor: Gary Peter Brown, Hitchin (GB)

(73) Assignee: RED HAT, INC., Raleigh, NC (US)

( * ) Notice: Subject to any disclaimer, the term of this patent is extended or adjusted under 35 U.S.C. 154(b) by 201 days.

(21) Appl. No.: 15/713,940

(22) Filed: Sep. 25, 2017

(65) Prior Publication Data

US 2019/0095509 A1    Mar. 28, 2019

(51) Int. Cl.
*G06F 17/00* (2019.01)
*G06F 16/28* (2019.01)
*G06F 16/487* (2019.01)
*G06F 11/36* (2006.01)

(52) U.S. Cl.
CPC .......... *G06F 16/284* (2019.01); *G06F 16/487* (2019.01); *G06F 11/362* (2013.01)

(58) Field of Classification Search
None
See application file for complete search history.

(56) References Cited

U.S. PATENT DOCUMENTS

| 7,404,180 | B2 | 7/2008 | Wedel et al. |
| 8,832,665 | B2 | 9/2014 | Greifeneder et al. |
| 9,189,355 | B1 | 11/2015 | Moturu |
| 9,549,030 | B2 | 1/2017 | Malloy et al. |
| 9,792,231 | B1 * | 10/2017 | Thompson .......... G06F 13/1642 |
| 2008/0071783 | A1 | 3/2008 | Langmead et al. |
| 2014/0019478 | A1 | 1/2014 | Wu et al. |

OTHER PUBLICATIONS

"Using End-to-End Tracing to Troubleshoot and Diagnose Device Problems", SAP Help Portal, https://help.sap.com/viewer/313e7789125149b3b5bb6f1c7e1ea322/3.0.13/en-US/ff67ce7731794578ba0b032fe6404bc0.html, 2 pgs.
"How to Record Casual Relationships / Sequencing between Sibling Spans #3", GitHub, https://github.com/opentracing/opentracing-go/issues/3, 5 pgs.

* cited by examiner

*Primary Examiner* — Anhtai V Tran
(74) *Attorney, Agent, or Firm* — Haynes and Boone, LLP

(57) ABSTRACT

Methods, systems, and computer program products are included for performing tracing in a distributed environment. An example method includes determining that a first span corresponds to a client span kind and that a second span corresponds to a server span kind. The first span is cached in association with a span identifier. An identifier associated with the second span is matched to the span identifier associated with the first span. Based on the matching, dependency information is generated corresponding to the first span and the second span.

19 Claims, 5 Drawing Sheets

DERIVING DEPENDENCY INFORMATION FROM TRACING DATA

FIELD OF DISCLOSURE

The present disclosure generally relates to computer program debugging, and more particularly to distributed tracing in a clustered computing environment.

BACKGROUND

Conventional microservice architectures are used to structure applications as a collection of services. Generally, decomposing an application into a collection of services results in deploying features of the application in independent modules that may be independently developed and tested. The services in the collection of services are typically able to interact using one or more standard interfaces, such as Application Programming Interfaces (APIs), to exchange information. One of the advantages provided by microservice architectures is that development is generally simplified by decomposing the features of applications into components that are smaller in size, which are more easily designed and tested.

Tracing is a technique that is used to identify performance issues and faults regarding an application. Tracing typically includes logging information about the application's execution for debugging purposes while developing the application or after release of the application when an error occurs. The logged information may include information regarding low-level messages and/or events corresponding to the application that are useful for debugging. Software tracing may be performed in a variety of ways, at the kernel-level and/or user-level, such as via tracing macros, debugger outputs, kernel markers, systems logs, and tracing frameworks.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: receiving a first span and parsing the first span to determine that the first span has a client span kind. The method also includes providing the first span to at least one dependency processor of one or more dependency processors. The method also includes caching, by the at least one dependency processor, the first span in association with a span identifier. The method also includes after caching the first span, receiving a second span and parsing the second span to determine that the second span has a server span kind. The method also includes providing the second span to a dependency processor of the one or more dependency processors; matching a parent identifier of the second span to the span identifier associated with the first span. The method also includes, based on the matching, generating dependency information corresponding to the first span and the second span. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause at least one machine to perform operations including: determining that a first span corresponds to a client span kind and that a second span corresponds to a server span kind; caching the first span in association with a span identifier; matching an identifier associated with the second span to the span identifier associated with the first span; and based on the matching, generating dependency information corresponding to the first span and the second span. Other examples of this aspect include corresponding computer systems, apparatus, and computer programs recorded on one or more computer storage devices, each to perform the actions of the methods.

One general aspect includes a server cluster system including: a non-transitory memory including instructions, and one or more hardware processors coupled to the non-transitory memory to read the instructions to perform operations including: determining, by a span collector, that a first span corresponding to a request from a client computing device has a client span kind and that a second span corresponding to a request from a server computing device has a server span kind. The operations further include providing, by the span collector, the first span and the second span to at least one dependency processor of one or more dependency processors. The operations further include caching, in a span cache, the first span in association with a span identifier. The operations further include matching, by the at least one dependency processor, an identifier associated with the second span to the span identifier associated with the first span. The operations further include, based on the matching by the at least one dependency processor, generating dependency information corresponding to the first span and the second span. Other examples of this aspect include corresponding computer systems, apparatus, and computer programs recorded on one or more computer storage devices, each to perform the actions of the methods.

Figure 1:
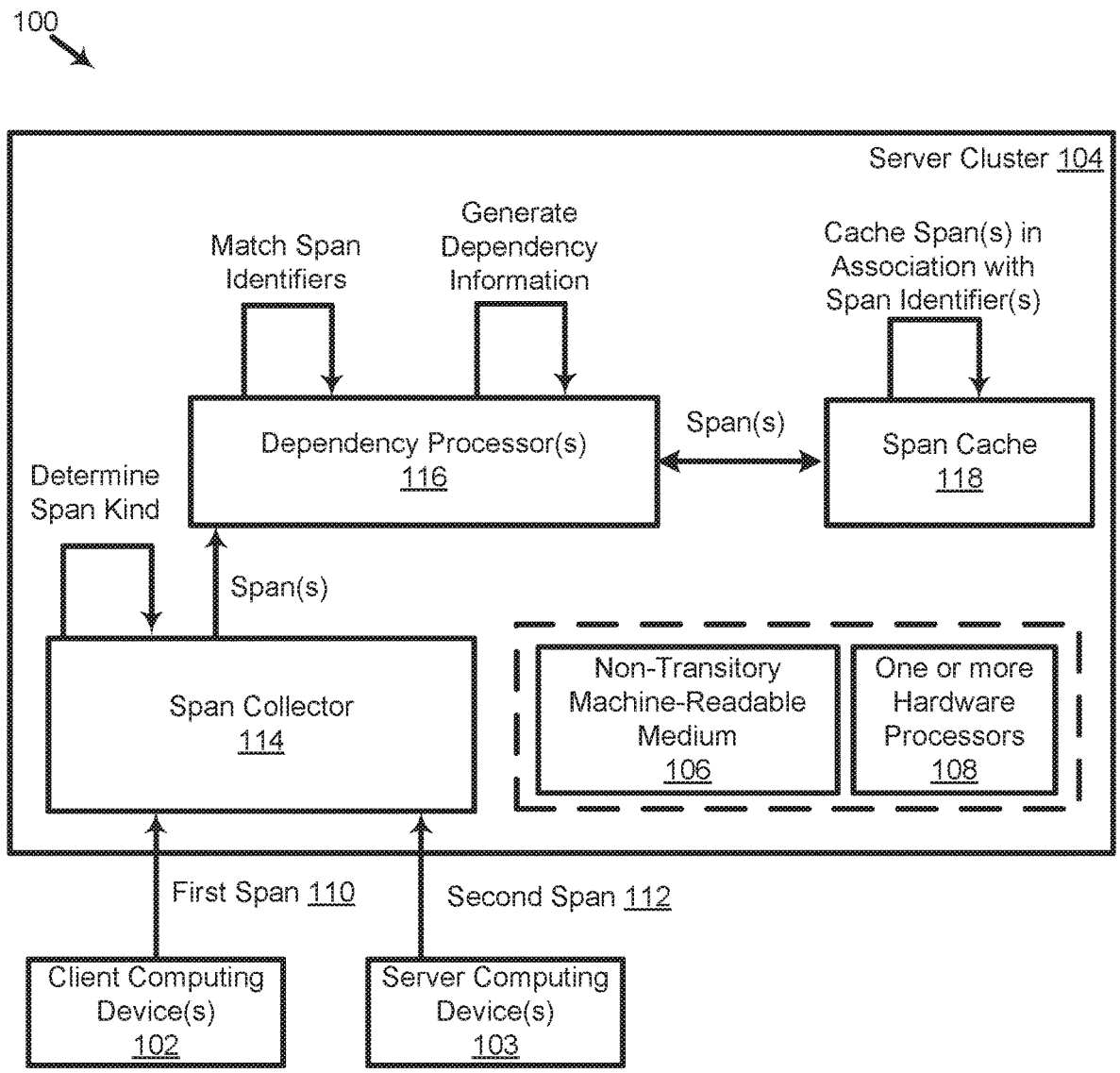
FIG. 1 is an organizational diagram illustrating a system including a server cluster that generates dependency information corresponding to spans, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for generating dependency information corresponding to tracing information. As a high-level overview, server cluster provides a cloud environment that includes a microservice architecture that includes an application that is composed of a collection of services. The server cluster uses distributed tracing by different components in the server cluster to capture invocation and performance information corresponding to the instances of the services for the application.

In more detail regarding the distributed tracing, when a service is invoked by another service each service instance reports a span to a backend server of the server cluster. The span includes tracing information from the perspective of the service instance. For example, if a first service instance calls a function of a second service instance, a tracing capability of the first service reports a client span with the details of the invocation from the first service's perspective, and a tracing capability of the second service reports a server span with the details of the invocation from the second service's perspective. In the present example, both the client and server spans are persisted independently in the server cluster environment.

Because the order in which the spans are reported to the backend server are non-deterministic, and the spans may be handled by different backend servers in the server cluster, conventional server clusters would be unable to determine any relation between the reported spans. That is, conventional servers would be unable to determine that the server span was generated by a service responsive to a call of that service by another service that generated the client span. Moreover, because conventional servers would not identify the spans as being related, the conventional servers would be unable to generate any inferences corresponding to these spans that would provide additional useful information for debugging or improving performance.

The techniques described herein address the issue of relating spans so that relevant information can be determined from dependent spans. As described herein, spans would be recognized as having a dependency relationship when the spans are generated corresponding to a call of a service instance by another service instance. These spans are reported to a span collector that determines the span kind (e.g., client span or server span), and publishes the spans to one or more dependency processors. The one or more dependency processors receive and cache the spans in association with span identifiers. A dependency processor performs matching to identify related spans, such as those spans that depend from other spans, by comparing the span identifiers. These dependent spans may include a same span identifier, such that client spans and their related server spans are able to be matched. Once the span identifiers are matched, dependency information is generated regarding the spans, which may include information such as identifiers of the source and target services that provided the spans, endpoint information, latency, geographic location information, and/or other relevant information.

The techniques herein provide useful advantages, such as by improving tracing information and allowing valuable inferences to be generated and collected regarding the services in a cluster environment. This improved tracing information can be used, for example, for improving fault detection abilities for debugging purposes and increasing performance of the services and the computing devices on which the services are executed.

FIG. 1 is an organizational diagram illustrating a system 100 for generating dependency information corresponding to spans.

The system 100 includes one or more client computing devices 102, one or more server computing devices 103, and a server cluster 104. In the present example, the client computing devices 102 generate requests that are processed by the server computing devices 103. The client computing devices 102 and the server computing devices 103 provide spans that include information about the requests to the server cluster 104, which performs tracing operations corresponding to the received spans.

The client computing devices 102, server computing devices 103, and server cluster 104 may each include one or more computing devices, such as a personal computer (PC), tablet PC, rack mount computer, cellular telephone, web appliance, server, network router, switch or bridge, or any machine capable of executing a set of instructions (sequential or otherwise) that specify actions to be taken by that machine. A computing device may include any collection of machines that individually or jointly execute a set (or multiple sets) of instructions to perform any one or more of the methodologies discussed herein. For example, a collection of machines may be communicatively coupled via one or more network devices and/or transport media. These machines may be provided as physical or virtual machines.

The client computing devices 102, server computing devices 103, and server cluster 104 are each structured with hardware, which includes physical elements such as one or more memory devices (e.g., non-transitory machine-readable memory 106) and one or more processors (e.g., one or more hardware processors 108). Each processor is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

In more detail regarding the one or more memory devices, a memory device is structured to include at least one non-transitory machine-readable medium on which is stored one or more sets of instructions (e.g., software) including any one or more of the methodologies or functions described herein. The memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a memory that are executable by a processor.

The client computing devices 102 provide requests to the server computing devices 103, which cause the server computing devices 103 to perform actions responsive to those requests. As merely one example of functionality that may be performed, the client computing device 102 may provide orders to the server computing devices 103 that the server computing devices 103 process to fulfill the orders. In some examples, the client computing devices 102 and the server computing devices 103 are structured on a same set of computing devices. In other examples, the client computing devices 102 and the server computing devices 103 are structured on a different set of computing devices.

The system 100 includes services that generate span information regarding functions performed by the services. In the present example, a first service for an application calls a second service for the application, resulting in the first service generating a first span 110 that includes information regarding the invocation of the call from the perspective of the first service, and the second service generates a second span 112 that includes information regarding the handling of the request from the perspective of the second service. These services that generate spans may be structured on the client computing devices 102 and/or on the server computing devices 103. For example, a client computing device of the client computing devices 102 may generate a first span 110 corresponding to a request sent by the client computing device to a server computing device of the server computing devices 103. After the server computing device receives the request from the client computing device, the server computing device 103 generates a second span 112. The first span 110 and the second span 112 are provided to the server cluster 104, which receives the spans at the span collector 114.

In some examples, span information includes an span identifier, an identifier of the service that generated the span, a span kind identifier that identifies whether the span is a client span (e.g., the span corresponds to a request sent by the service) or a server span (e.g., the span corresponds to a request received by the service), time information corresponding to the information reported in the span, endpoint information, geographic location information regarding the service, and so forth. This span information may be provided in various structures, such as in a class, tuple, flat text, or other data structure.

In more detail regarding the span identifier, the span identifier may be generated by a service and included in a client span generated by a requesting service. Services that receive a request from the requesting service may generate server spans that include the same span identifier that was included in the client span. In some examples, each span includes a unique identifier, as well as a parent identifier that identifies the unique identifier of the span corresponding to a calling service instance that provides a request. That is, the calling service instance may provide the parent identifier to the called service instance so that the called service may include the parent identifier in its generated server span.

As shown, the first span 110 and the second span 112 are reported to a span collector 114. In the present example, the span collector 114 is structured as one or more application instances running on one or more computing elements of the server cluster 104. In some examples, these one or more application instances are provided on separate virtual machines. The spans (e.g., the first span 110 and the second span 112) may be provided to the span collector in any order. The span collector 114 is structured to parse the spans to retrieve the span kind identifiers from the spans. The span collector 114 provides the spans to one or more dependency processors 116.

The dependency processor(s) 116 are structured as one or more application instances running on one or more computing elements of the server cluster 104. In some examples, these one or more application instances are provided on separate virtual machines. The dependency processors 116 store received spans in a span cache 118. The span cache 118 is structured as one or more data stores, which may include one or more database(s) (such as relational databases and/or other types of databases) to store information contained in the spans. For example, span identifiers may be stored as database keys, which are associated with values in the database that include the information corresponding to the spans, such as the span kind values and/or other span values. In some examples, the span cache 118 is structured as a shared cache that is accessed by one or more dependency processors 116, while in other examples, the span cache 118 is structured as a local cache of a single dependency processor.

The dependency processors 116 access the span cache 118 to match the span identifiers and/or parent identifiers of received spans with the span identifiers and/or parent identifiers of spans stored in the span cache 118. Based on the identified matching identifiers, the dependency processors 116 generate dependency information corresponding to the spans, such as by identifying the client spans and their related server spans, comparing timing information in the spans to identify latency information, and/or performing other determinations and actions relating to the matching spans, such as aggregating the matched spans or providing alerts corresponding to the matched spans.

Figure 2:
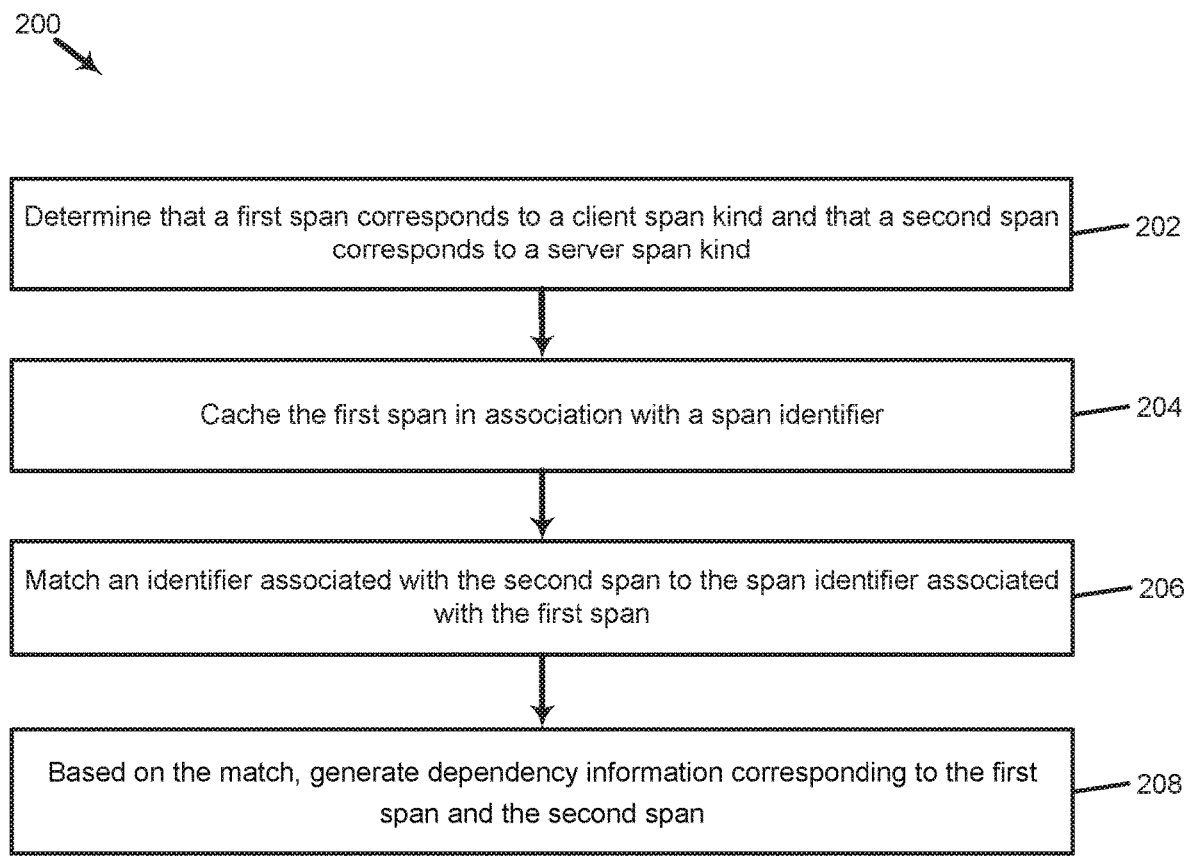
FIG. 2 is a flow diagram illustrating a method for generating dependency information corresponding to spans, in accordance with various examples of the present disclosure.

FIG. 2 is a flow diagram of a method 200 for generating dependency information corresponding to spans, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. For example, the method may be performed by the server cluster 104 that is described in further detail with respect to FIG. 1.

At action 202, an application such as the span collector receives one or more spans and parses the spans to determine a span kind corresponding to each span. In the present example, the span collector parses span information from a first span and identifies that the first span corresponds to a client span kind. In the present example, the span collector parses span information from a second span and identifies that the second span corresponds to a server span kind. Span kinds may be tagged in each span using alphanumeric text. For example, the first span may include a client identifier and the second span may include a server identifier. In the present example, services designate the span kind in a span based on whether the service is sending a request or receiving a request. In more detail, a service that is sending a request to another service may generate a span having a client span kind and a service that receives and processes the request may generate a span having a server span kind. Span kinds may be indicated in the spans using various different identifiers. The client and server identifiers are merely some examples of identifiers that may be used to designate whether the span is generated by a service that generates or receives a request or call (such as a function call).

At action 204, the span collector publishes the parsed spans by providing the spans to one or more dependency processors that consume the spans by receiving and caching the spans. In the present example, the spans are cached according to their span identifiers, which may be used for later lookups regarding the spans.

At action 206, the one or more dependency processors match an identifier associated with the second span to the span identifier associated with the first span. The matching may include parsing the identifier of the second span and performing a lookup using the span cache to identify that the first span has a same identifier as the second span.

At action 208, the one or more dependency processors generate dependency information for the matching first span and second span.

Figure 3:
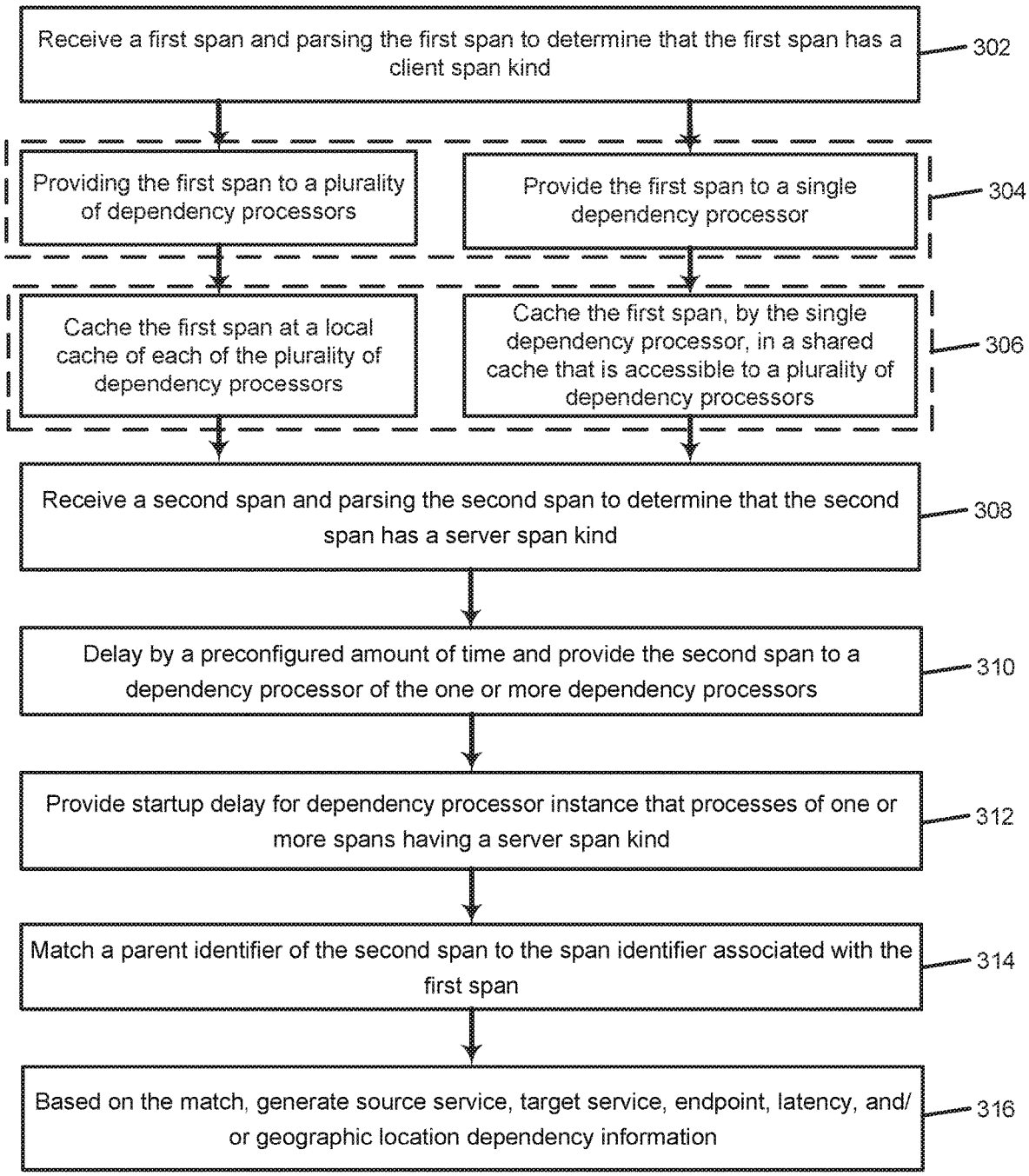
FIG. 3 is a flow diagram illustrating a method for generating dependency information corresponding to spans, in accordance with various examples of the present disclosure.

FIG. 3 is a flow diagram of a method for generating dependency information corresponding to spans, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. For example, the method may be performed by the server cluster 104 that is described in further detail with respect to FIG. 1.

At action 302, a span collector receives a first span and parses the first span to determine that the first span includes an identifier indicating that the first span has a client span kind.

At action 304, the span collector publishes the span by providing the span to one or more dependency processors. As shown, this may include providing the span to a plurality of dependency processors or providing the span to a single dependency processor via a stream or other transport means. In some examples, the span collector determines whether to provide the span to a plurality of processors or to a single dependency processor based on the span kind associated with the span and the cache configuration of the dependency processors. For example, spans associated with a client span kind may be distributed to multiple dependency processors in a multi-cast manner if the dependency processors have local caches and do not have a shared cache. In other examples, spans associated with a client span kind may be distributed to a single dependency processor if the dependency processor includes a shared cache that is accessible to other dependency processors.

At action 306, if the span was provided to a plurality of dependency processors, the plurality of processors cache the span at their local caches. That is, multiple copies of the span are cached across the plurality of dependency processors so that each dependency processor has local access to the span at its local cache. If the span was provided to a single dependency processor, the single dependency processor caches the span at a shared cache that is accessible to a plurality of dependency processors. That is, each dependency processor has access to the shared cache such that the stored span is available to multiple dependency processors. Accordingly, the one or more dependency processors receive a stream or other transport means from the span collector and are thus able to consume the spans sent from the span collector.

At action 308, a span collector receives a second span and parses the second span to determine that the second span includes an identifier indicating that the second span has a server span kind. While this action is shown below action 302, in other examples the span collector may receive the span having the server span kind prior to or simultaneous with receiving the span having the client span kind.

At action 310, the second span having the server span kind is delayed by a preconfigured amount of time to provide the one or more dependency processors with time to process the corresponding span having the client span kind. The delay time may be preconfigured by a user or set by the system based on determining processing metrics corresponding to the spans. After being delayed by the preconfigured amount of time, the second span is sent to a dependency processor of the one or more dependency processors. Accordingly, the delivery of the span from the span collector to a dependency processor is delayed. In some examples, spans having a server span kind are sent from the span collector to a single dependency processor via a message in a point-to-point manner. In some examples, load balancing is performed to select the particular dependency processor of the one or more dependency processors to receive and process the span.

At action 312, a startup of a dependency processor instance for processing the second span is delayed by a preconfigured amount of time. For example, as described above, the delay may be implemented by delaying delivery of a message including the second span. In another example, a second span may be maintained in a buffer while the dependency processor instance is delayed for a preconfigured amount of time and then started after the delay. The delayed dependency processor instance receives the second span, such as by accessing the buffer to retrieve the second span, and then processes the second span. Accordingly, due to the messaging and/or startup delay of the dependency processor instance, the span having the server span kind has its processing delayed. This provides time for the corresponding client span to be processed and cached prior to processing the server span. Accordingly, by the time the server span is processed, the client span is already cached, thus allowing the server span to be matched to the cached client span.

At action 314, the dependency processor instance searches the cache, such as via a lookup table, to match a parent identifier that is included with the second span. In the present example, the parent identifier includes an alphanumeric string that is matched with the identifier that was cached with the first span. Accordingly, based on the matching between the parent identifier associated with the second span and the identifier cached with the first span, the dependency processor determines that the second span is related to the first span by being a dependent span.

At action 316, the dependency processor determines dependency information corresponding to the first span and the second span. In the present example, determining the dependency information includes parsing service information from the first span and the second span to determine identifiers of the services that generated each span. These services include the source service that generated the first span having the client span kind and the target service that received a request from the source service and then generated the second span having the server span kind. The dependency processor parses a time from the first and second spans to determine a time difference between the spans, which indicates the latency between the source service generating the request and the target service processing the request. The dependency processor also parses geographic information and endpoint information from each of the spans to identify geographic server location information corresponding to the spans, server identity information, and/or other information regarding the servers that provide the services. In the present example, the services may be offered by a same server at a same geographic location or by different servers located at different geographic locations.

In yet other examples, dependency information that is derived from the matched spans is published to one or more other components for further analysis and action. For example, an alert corresponding to the derived dependency information may be generated for a user or component. As another example, the dependency information may be published to an aggregator that stores a collection of derived dependency information.

Figure 4A:
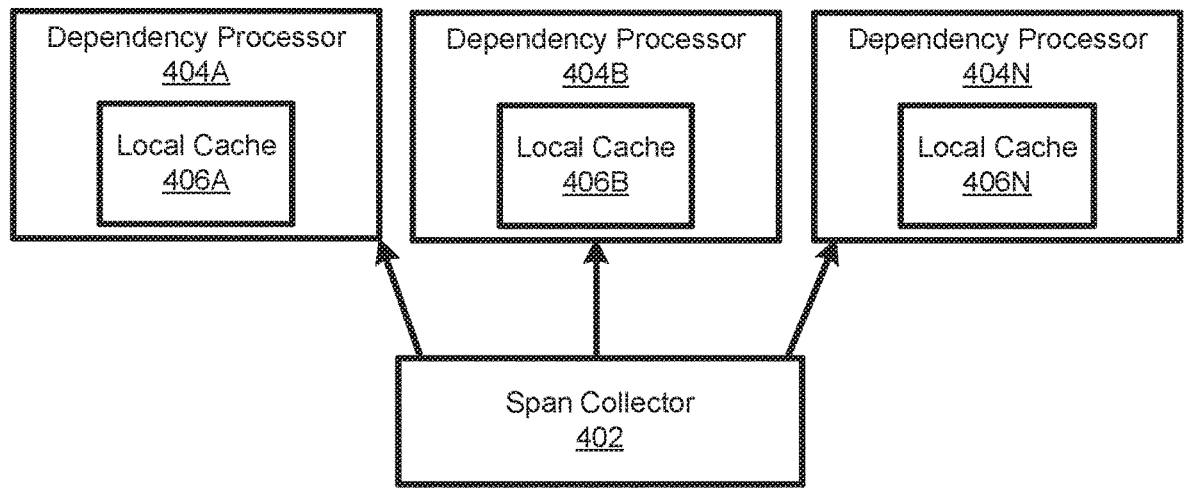
FIG. 4A is an organizational diagram illustrating a structure for providing span information from a span collector to a plurality dependency processors, in accordance with various examples of the present disclosure.
Figure 4B:
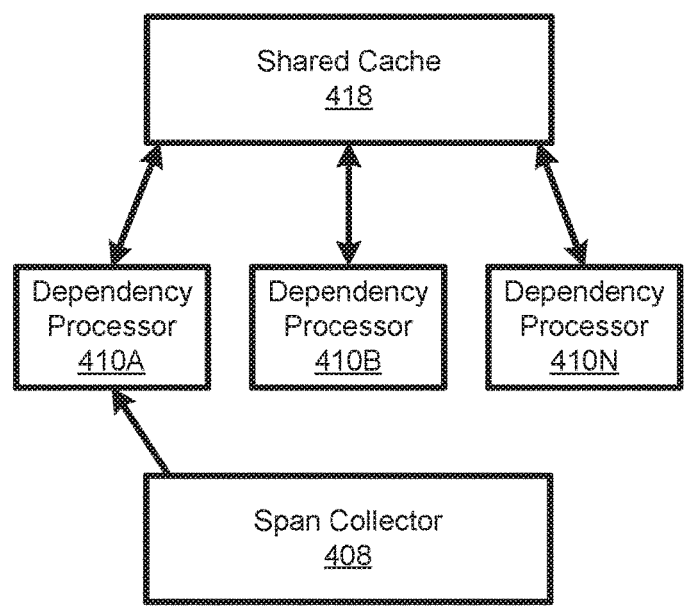
FIG. 4B is an organizational diagram illustrating a structure for providing span information from a span collector to a plurality dependency processors, in accordance with various examples of the present disclosure.

FIG. 4A and FIG. 4B are organizational diagrams illustrating structures for providing span information from a span collector to a plurality dependency processors, in accordance with various examples of the present disclosure.

As described in steps 304 and 306 regarding FIG. 3, various configurations may be provided for storing and processing spans (e.g., spans having a client span kind) by the dependency processor(s). As shown in FIG. 4A, a plurality of dependency processors including dependency processor 404A, dependency processor 404B, and dependency processor 404N each receive a span from the span collector 402. In the present example, the spans sent to each of the dependency processors 404A, 404B, and 404N have identical content and differ only in their metadata that indicates that target dependency processor to which the span is sent. In the present example, each of the dependency processors 404A, 404B, and 404N include a local cache 406A, 406B, and 406N, respectively to store the span. Accordingly, the span is stored in multiple different local caches that are each assigned and accessible to a particular dependency processor.

As shown in FIG. 4B, a span collector 408 sends a span to a dependency processor 410A. Dependency processors 410B and 410N may receive other spans from the span collector 408. As distinguished from FIG. 4A, rather than sending a same span to multiple dependency processors, the span is sent to a single dependency processor. The dependency processor 410A stores the span in a shared cache 418. In some examples, the span collector 408 performs load balancing to determine to send the span to dependency processor 410A.

The shared cache 418 is also accessible to dependency processors 410B and 410N, such that all of the dependency processors 410A, 410B, and 410N may perform matching with respect to spans received and cached by any of the dependency processors. That is, the cached spans are accessible to all of the dependency processors. In some examples, the shared cache 418 is local to at least one of the dependency processors and remote from one or more of the other dependency processors. In other examples, the shared cache 418 is not local to any of the dependency processors.

Figure 5:
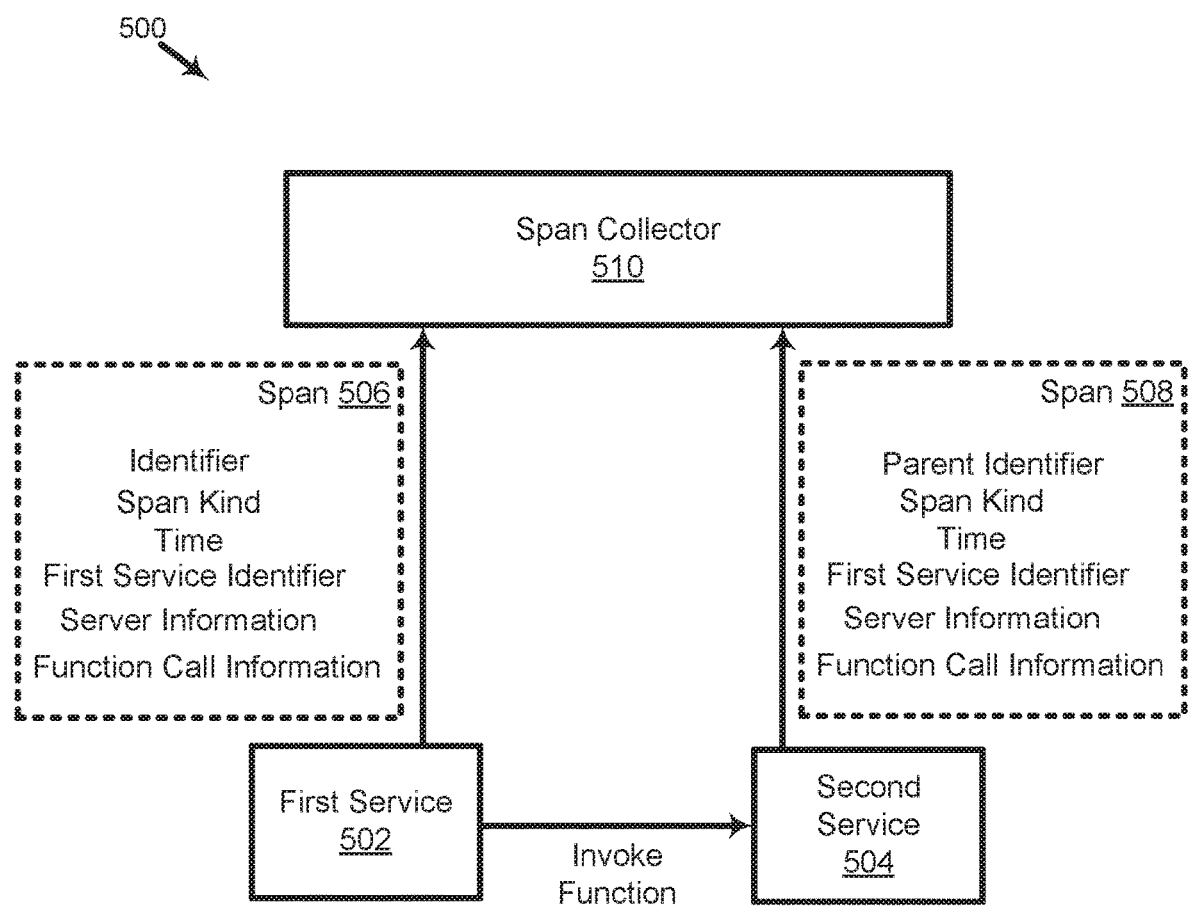
FIG. 5 is an organizational diagram illustrating an interaction between services that generate spans and provide the spans to a span collector, in accordance with various examples of the present disclosure.

FIG. 5 is an organizational diagram illustrating an interaction between services that generate spans and provide the spans to a span collector, in accordance with various examples of the present disclosure.

In the present example, a microservices architecture 500 includes a first service 502 and a second service 504. The first service performs one or more operations and attempts to call a function of the second service 504. Accordingly, the first service sends an invoke function request to the second service, which then performs one or more operations responsive to the invoke function request.

As part of the invoke function request, the first service 502 generates a span 506 that provides various information, from the perspective of the first service 502, regarding the invoke function request to the span collector 510. As shown in the present example, this information includes an identifier generated for the span 506 by the first service 502, a span kind (which in this example would be a client span kind), a time corresponding to the invoke function request, an identifier indicating the identity of the first service 502, server information corresponding to the server that executes the instance corresponding to the first service 502, and additional function call information regarding the function that the first service 502 is invoking, such as the identity of the function and any parameters being sent to the second service 504 as part of the function call.

The second service 504, upon receiving the invoke function request, generates a span 508 that provides various information, from the perspective of the second service 504, regarding the invoke function request to the span collector 510. As shown in the present example, this information includes a parent identifier generated for the span 508 by the second service 504, a span kind (which in this example would be a server span kind), a time corresponding to the received invoke function request, an identifier indicating the identity of the second service 504, server information corresponding to the server that executes the instance corresponding to the second service 504, and additional function call information regarding the function that the second service 504 is invoking, such as the identity of the function and any parameters being received from the first service 502 as part of the function call.

In the present example, the parent identifier may match the identifier generated for the span 506, by the first service 502 providing the identifier to the second service 504 in the invoke function request, such that the second service 504 is able to place the identifier into the span 508 as the parent identifier. Upon receiving the span 506 and/or the span 508, the span collector 510 may then provide one or more of the spans to one or more dependency processors. In some examples, the span collector 510 performs one or more operations to delay the span 508 such that the one or more dependency processors have time to process the span 506 prior to receiving the span 508.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A server cluster system comprising:
   a non-transitory memory; and
   one or more hardware processors coupled to the non-transitory memory to execute instructions from the non-transitory memory to perform operations comprising:

determining, by a span collector, that a first span from a client computing device has a client span kind and that a second span from a server computing device has a server span kind;

providing, by the span collector, the first span and the second span to at least one dependency processor of one or more dependency processors;

caching, in a span cache, the first span in association with a span identifier;

matching, by the at least one dependency processor, an identifier associated with the second span to the span identifier associated with the first span; and based on the matching by the at least one dependency processor, generating dependency information corresponding to the first span and the second span.

2. The server cluster system of claim 1, wherein providing the first span to at least one dependency processor includes providing the first span to a plurality of dependency processors, and wherein the caching of the first span includes storing the first span at a local cache of each of the plurality of dependency processors.

3. The server cluster system of claim 1, wherein providing the first span to the at least one dependency processor includes providing the first span to a single dependency processor, and wherein the caching of the first span includes storing the first span, by the single dependency processor, in a shared cache that is accessible to a plurality of dependency processors.

4. The server cluster system of claim 1, wherein the providing of the second span to the at least one dependency processor includes delaying a delivery of the second span by a preconfigured amount of time, and wherein an instance corresponding to the at least one dependency processor includes a preconfigured startup delay before processing the second span.

5. The server cluster system of claim 1, wherein the first span and the second span include a same span identifier.

6. The server cluster system of claim 1, wherein the generated dependency information includes an indication of at least one of: a source service, a target service, an endpoint, a latency, a geographic location corresponding to the source service, or a geographic location corresponding to the target service.

7. A computer-implemented method comprising:

receiving a first span and parsing the first span to determine that the first span has a client span kind;

providing the first span to at least one dependency processor of one or more dependency processors;

caching, by the at least one dependency processor, the first span in association with a span identifier;

after caching the first span, receiving a second span and parsing the second span to determine that the second span has a server span kind;

providing the second span to a dependency processor of the one or more dependency processors;

matching a parent identifier of the second span to the span identifier associated with the first span; and generating, based on the matching, dependency information corresponding to the first span and the second span.

8. The method of claim 7, wherein providing the first span to the at least one dependency processor includes providing the first span to a plurality of dependency processors, and wherein the caching of the first span by the at least one dependency processor includes storing the first span at a local cache of each of the plurality of dependency processors.

9. The method of claim 7, wherein providing the first span to the at least one dependency processor includes providing the first span to a single dependency processor, and wherein the caching of the first span includes storing the first span, by the single dependency processor, in a shared cache that is accessible to a plurality of dependency processors.

10. The method of claim 7, wherein the providing of the second span to the dependency processor includes delaying a delivery of the second span by a preconfigured amount of time, and wherein an instance corresponding to the dependency processor includes a preconfigured startup delay before processing the second span.

11. The method of claim 7, wherein the first span and the second span include a same span identifier.

12. The method of claim 7, wherein the generated dependency information includes an indication of at least one of: a source service, a target service, an endpoint, a latency, a geographic location corresponding to the source service, or a geographic location corresponding to the target service.

13. The method of claim 7, further comprising:
storing the generated dependency information in a repository.

14. The method of claim 7, further comprising:
publishing the generated dependency information for further analysis.

15. A non-transitory machine-readable medium having stored thereon machine-readable instructions executable to cause at least one machine to perform operations comprising:

determining that a first span corresponds to a client span kind and that a second span corresponds to a server span kind;

providing the first span to a single dependency processor;

caching the first span in association with a span identifier, wherein the caching of the first span includes storing the first span, by the single dependency processor, in a shared cache that is accessible to a plurality of dependency processors;

matching an identifier associated with the second span to the span identifier associated with the first span; and based on the matching, generating dependency information corresponding to the first span and the second span.

16. The non-transitory machine-readable medium of claim 15, wherein providing the first span to a single dependency processor includes providing the first span to a plurality of dependency processors, wherein the caching of the first span includes storing the first span at a local cache of each of the plurality of dependency processors.

17. The non-transitory machine-readable medium of claim 15, wherein the operations further comprise:

providing the second span to at least one dependency processor, the providing including delaying a delivery of the second span by a preconfigured amount of time, wherein an instance corresponding to the at least one dependency processor includes a preconfigured startup delay before processing the second span.

18. The non-transitory machine-readable medium of claim 15, wherein the first span and the second span include a same span identifier.

19. The non-transitory machine-readable medium of claim 15, wherein the generated dependency information includes in indication of at least one of: a source service, a target service, an endpoint, a latency, a geographic location corresponding to the source service, or a geographic location corresponding to the target service.

* * * * *